United States Patent [19]

Luther et al.

[11] Patent Number: 5,721,940
[45] Date of Patent: Feb. 24, 1998

[54] FORM IDENTIFICATION AND PROCESSING SYSTEM USING HIERARCHICAL FORM PROFILES

[75] Inventors: Willis J. Luther, Irvine; Shin-Ywan Wang, Tustin, both of Calif.

[73] Assignee: Canon Information Systems, Inc., Costa Mesa, Calif.

[21] Appl. No.: 832,849

[22] Filed: Apr. 4, 1997

Related U.S. Application Data

[63] Continuation of Ser. No. 156,705, Nov. 24, 1993, abandoned.

[51] Int. Cl.[6] .................................................. G06F 17/27
[52] U.S. Cl. ............................................................ 395/767
[58] Field of Search .......................... 395/761, 766–771, 395/779–785; 382/175, 219, 283; 358/403, 453

[56] References Cited

U.S. PATENT DOCUMENTS

| | | | |
|---|---|---|---|
| 3,726,993 | 4/1973 | Lavallee | 358/426 |
| 4,318,184 | 3/1982 | Millett et al. | 395/601 |
| 4,481,603 | 11/1984 | McCaskill et al. | 395/149 |
| 4,559,644 | 12/1985 | Kataoka et al. | 382/254 |
| 4,646,250 | 2/1987 | Childress | 395/149 |
| 4,750,135 | 6/1988 | Boilen | 364/514 C |
| 4,807,123 | 2/1989 | Komatsu et al. | 395/149 |
| 4,811,416 | 3/1989 | Nakamura | 382/317 |
| 4,813,077 | 3/1989 | Woods et al. | 382/138 |
| 4,933,979 | 6/1990 | Suzuki et al. | 382/173 |
| 4,933,984 | 6/1990 | Nakano et al. | 382/175 |
| 4,949,392 | 8/1990 | Barski et al. | 382/283 |
| 4,951,196 | 8/1990 | Jackson | 364/401 |
| 5,001,769 | 3/1991 | Reid-Green et al. | 382/283 |
| 5,010,580 | 4/1991 | Vincent et al. | 382/163 |
| 5,038,392 | 8/1991 | Morris et al. | 382/175 |

(List continued on next page.)

FOREIGN PATENT DOCUMENTS

WO6911703  11/1989  WIPO.

OTHER PUBLICATIONS

Taylor et al., Registration and Extraction of Data from Forms, Pattern Recognition, 1992 Intl Conference Proc., 1992, pp. 173–176.

Dayao et al., SuperForms: A Security Enhanced Smart Electronic Form Management System, GLOBECOM '90, 1990, pp. 1079–1083.

(List continued on next page.)

*Primary Examiner*—Anton W. Fetting
*Attorney, Agent, or Firm*—Fitzpatrick, Cella, Harper & Scinto

[57] ABSTRACT

A method and an apparatus for identifying completed forms includes scanning a plurality of different blank forms, and creating hierarchical profiles of each scanned blank form. Each hierarchical form profile is stored in a dictionary. Once the form dictionary is created, a completed form is scanned. A hierarchical profile of the completed form is created, and the hierarchical profile of the completed form is compared with stored hierarchical form profiles. In accordance with the result of comparison, one of the stored hierarchical form profiles is identified as corresponding to the completed form hierarchical profile. Based on the identity of the corresponding hierarchical form profile, the completed form can be routed for further processing. A further aspect of the invention makes it possible to extract data from predesignated fields which may be unique to that particular form within a completed form based on the form's identity. Furthermore, by using the form dictionary, it is possible to identify a completed form, extract data from the completed form, store the data with the form's identity, and display the completed form by drawing the identified form using the vectorized data from the form dictionary and superimposing the extracted data from the completed form into respective data fields.

32 Claims, 18 Drawing Sheets

U.S. PATENT DOCUMENTS

| | | | |
|---|---|---|---|
| 5,050,101 | 9/1991 | Kiuchi et al. | 395/148 |
| 5,054,096 | 10/1991 | Beizer | 382/305 |
| 5,101,447 | 3/1992 | Sokoloff et al. | 382/283 |
| 5,119,433 | 6/1992 | Will | 382/138 |
| 5,119,437 | 6/1992 | Kuwamura et al. | 382/175 |
| 5,123,062 | 6/1992 | Sangu | 382/174 |
| 5,129,053 | 7/1992 | Makihara | 395/149 |
| 5,134,669 | 7/1992 | Keogh et al. | 382/318 |
| 5,140,650 | 8/1992 | Casey et al. | 382/283 |
| 5,159,667 | 10/1992 | Borrey et al. | 395/148 |
| 5,177,793 | 1/1993 | Murai et al. | 382/187 |
| 5,179,650 | 1/1993 | Fukui et al. | 395/782 |
| 5,293,429 | 3/1994 | Pizano et al. | 382/202 |
| 5,299,305 | 3/1994 | Oomae et al. | 395/767 |
| 5,317,646 | 5/1994 | Sang, Jr. et al. | 395/767 X |
| 5,333,313 | 7/1994 | Heising | 395/601 |
| 5,379,373 | 1/1995 | Hayashi et al. | 395/774 |
| 5,410,646 | 4/1995 | Tondevold et al. | 395/768 |
| 5,416,896 | 5/1995 | Motoyama | 395/776 |
| 5,438,657 | 8/1995 | Nakatani | 395/767 |
| 5,459,827 | 10/1995 | Allouche et al. | 395/774 |
| 5,490,242 | 2/1996 | Tamura | 395/774 |
| 5,499,331 | 3/1996 | Hayashi et al. | 395/774 |

OTHER PUBLICATIONS

Gladney, A Storage Subsystem for Image and Records Management, IBM Systems Journal, Sep. 1993, vol. 32, No. 3, pp. 512–540.

Konsynski, Strategic Control in the Extended Enterprise, IBM Systems Journal, Mar. 1993, vol. 32, No. 1, pp. 111–142.

"Converting Paper Documents To Electric Images With Automatic Document Recognition, Index Generation And Template Removal", Anonymous, IBM Technical Disclosure Bulletin, vol. 34, No. 10B, Mar. 1992, pp. 435–439.

Maier, The Theory of Relational Databases, 1983, pp. 93–104.

Canon Information Systems: INVOICE

PERIOD COVERED:     DATE:

| From: Canon Information Systems<br>System Engineering<br><br>Attn: | To:<br><br><br>Attn: |

| Customer Ref#: | Project Identifier | Purchase Order # | Date |

PAY THIS AMOUNT:

| qty | part # | description | unit price | extended price |
|---|---|---|---|---|
| | | | | |
| | | | | |
| | | | | |
| | | | | |
| | | | | |
| | | | | |
| | | | | |
| | | | | |
| | | | | |

Sub-Total

Discount

Total

1       nontext index = 1 x=23 y=19 1=622 w=39 att = 40
  1.1    index = 1 x=31 y=33 1=22 w=281 att = 1
             x=31 y=33 1=22 w=281 att = 1
  1.2    index = 2 x=324 y=34 1=16 w=96 att = 1
             x=324 y=34 1=16 w=96 att = 1
  1.3    index = 3 x=148 y=66 1=10 w=126 att = 1
             x=148 y=66 1=10 w=126 att = 1
  1.4    index = 4 x=376 y=65 1=10 w=41 att = 1
             x=376 y=65 1=10 w=41 att = 1
  1.5    index = 5 x=283 y=251 1=10 w=136 att = 1
             x=283 y=251 1=10 w=136 att = 1
  1.6    index = 9 x=350 y=555 1=10 w=57 att = 1
             x=350 y=555 1=10 w=57 att = 1
  1.7    index = 10 x=351 y=582 1=9 w=52 att = 1
             x=351 y=582 1=9 w=52 att = 1
  1.8    index = 11 x=352 y=608 1=10 w=30 att = 1
             x=352 y=608 1=10 w=30 att = 1
  1.9    nontext index = 1 x=423 y=33 1=47 w=92 att = 40
  1.10   nontext index = 2 x=277 y=55 1=24 w=91 att = 40
  1.11   nontext index = 3 x=39 y=82 1=154 w=477 att = 40
     1.11.1   nontext index = 0 x=45 y=96 1=84 w=209 att = 1000
        1.11.1.1 index = 6 x=45 y=96 1=46 w=209 att = 1
             x=45 y=96 1=13 w=209 att = 1
             x=45 y=114 1=13 w=123 att = 1
             x=45 y=132 1=10 w=122 att = 1
        1.11.1.2 index = 7 x=45 y=150 1=11 w=135 att = 1
             x=45 y=150 1=11 w=135 att= 1
        1.11.1.3 index = 8 x=45 y=168 1=12 w=108 att = 1
             x=45 y=168 1=12 w=108 att = 1
     1.11.2   nontext index = 0 x=280 y=95 1=81 w=31 att = 1000
        1.11.2.1 index = 3 x=280 y=95 1=9 w=19 att = 1
             x=280 y=95 1=9 w=19 att = 1
        1.11.2.2 index = 4 x=281 y=167 1=9 w=30 att = 1
             x=281 y=167 1=9 w=30 att = 1
     1.11.3   nontext index = 0 x=45 y=198 1=13 w=435 att = 1000
        1.11.3.1 index = 5 x=45 y=199 1=10 w=98 att = 1
             x=45 y=199 1=10 w=98 att = 1
        1.11.3.2 index = 6 x=167 y=198 1=13 w=100 att = 1
             x=167 y=198 1=13 w=100 att = 1
        1.11.3.3 index = 7 x=302 y=199 1=9 w=99 att =1
             x=302 y=199 w=99 att= 1
        1.11.3.4 index = 8 x=454 y=199 1=9 w=26 att = 1
             x=454 y=199 1=9 w=26 att = 1
  1.12   nontext index = 4 x=424 y=241 1=24 w=92 att = 40
  1.13   nontext index = 5 x=37 y=274 1=353 w=477 att = 8
     1.13.1   index = 1 x=49 y=285 1=12 w=19 att = 1
             x=49 y=285 1=12 w=19 att = 1
     1.13.2   index = 2 x=103 y=283 1=13 w=35 att = 1
             x=103 y=283 1=13 w=35 att = 1
     1.13.3   index = 3 x=222 y=281 1=13 w=69 att = 1
             x=22 y=281 1=13 w=69 att = 1
     1.13.4   index = 4 x=365 y=278 1=222 w=30 att = 1
             x=365 y=278 1=222 w=30 att = 1
     1.13.5   index = 5 x=437 y=277 1=14 w=52 att = 1
             x=437 y=277 1=14 w=52 att = 1

Canon Information Systems: INVOICE | CIS-20445

PERIOD COVERED: 9/92  DATE: 10/12/92

| From: Canon Information Systems<br>System Engineering<br>3000 Bushman Street<br>Costa Mesa, CA 92232<br><br>Attn: Jim Montana | To: Imaginetic, Inc.<br>8 Spicetree Ave<br>Bovine, CA 92222<br><br>Attn: Linda Bluter |
|---|---|

| Customer Ref#:<br>IMA-302 | Project Identifier<br>Messager | Purchase Order #<br>092292-23 | Date<br>9/22/92 |
|---|---|---|---|

PAY THIS AMOUNT: 3,200.00

| qty | part # | description | unit price | extended price |
|---|---|---|---|---|
| 2 | MM-200 | Messager Run-Time | 800.00 | 1,600.00 |
| 1 | MM-100 | Messager SDK | 1,800.00 | 1,800.00 |
|   |   |   |   |   |
|   |   |   |   |   |
|   |   |   |   |   |
|   |   |   |   |   |
|   |   |   |   |   |
|   |   |   |   |   |
|   |   |   |   |   |
|   |   |   | Sub-Total | 3,400.00 |
|   |   |   | Discount | 200.00 |
|   |   |   | Total | 3,200.00 |

FIG.6  40

1   nontext index = 1 x=25 y=22 1=621 w=422 att = 40
   1.1    index = 1 x=30 y=37 1=22 w=270 att = 1
              x=30 y=37 1=22 w=270 att = 1
   1.2    index = 2 x=311 y=39 1=15 w=94 att = 1
              x=311 y=39 1=15 w=94 att = 1
   1.3    index = 3 x=150 y=69 1=10 w=125 att = 1
              x=150 y=69 1=10 w=125 att = 1
   1.4    index = 4 x=378 y=69 1=10 w=40 att = 1
              x=378 y=69 1=10 w=40 att = 1
   1.5    index = 5 x=284 y=255 1=10 w=134 att = 1
              x=284 y=255 1=10 w=134 att = 1
   1.6    index = 9 x=350 y=557 1=10 w=57 att = 1
              x=350 y=557 1=10 w=57 att = 1
   1.7    index = 10 x=351 y=583 1=10 w=52 att = 1
              x=351 y=583 1=10 w=52 att = 1
   1.8    index = 11 x=352 y=610 1=10 w=30 att = 1
              x=352 y=610 1=10 w=30 att = 1
   1.9    nontext index = 1 x=424 y=37 1=47 w=92 att = 40
       1.9.1   nontext index = 0 x=436 y=44 1=10 w=56 att = 1000
            1.9.1.1 nontext index = 1 x=436 y=44 1=10 w=56 att = 81
       1.9.2   nontext index = 0 x=436 y=66 1=10 w=44 att = 1000
            1.9.2.1  index = 2 x=436 y=66 1=10 w=44 att = 1
                    x=436 y=66 1=10 w=44 att = 1
   1.10   nontext index = 2 x=278 y=59 1=25 w=1 att =40
       1.10.1  nontext index = 1 x=284 y=67 1=10 w=23 att = 4003
   1.11   nontext index = 3 x=41 y=86 1=154 w=475 att = 2
       1.11.1  index = 20 x=47 y=99 1=84 w=201 att = 1
              x=47 y=99 1=13 w=201 att = 1
              x=47 y=117 1=14 w=117 att = 1
              x=47 y=136 1=9 w=115 att = 1
              x=47 y=153 1=11 w=131 att = 1
              x=47 y=171 1=12 w=104 att = 1
       1.11.2  index = 23 x=168 y=201 1=30 w=101 att = 1
              x=169 y=201 1=13 w=100 att = 1
              x=168 y=218 1=13 w=53 att = 1
       1.11.3  index = 24 x=47 y=202 1=27 w=99 att =1
              x=47 y=202 1=10 w=99 att = 1
              x=50 y-219 1=10 w=45 att = 1
       1.11.4  index = 25 x=281 y=99 1=9 w=19 att = 1
              x=281 y=99 1=9 w=19 att = 1
       1.11.5  index = 27 x=308 y=101 1=47 w=107 att = 1
              x=308 y=101 1=47 w=95 att = 1
              x=308 y =118 1=13 w=107 att = 1
              x=308 y=137 1=11 w=98 att = 1
       1.11.6  index = 28 x=282 y=170 1=11 w=116 att = 1
              x=282 y=170 1=11 w=116 att = 1
       1.11.7  index = 29 x=303 y=202 1=10 w=98 att = 1
              x=303 y=202 1=10 w=98 att = 1
       1.11.8  index = 30 x=303 y=221 1=10 w=55 att = 1
              x=303 y=221 1=10 w=55 att = 1
       1.11.9  index = 31 x=454 y=203 1=9 w=27 att = 1
              x=454 y=203 1=9 w=27 att = 1
       1.11.10 index = 32 x=433 y=22 1=9 w=39 att= 1
              x=433 y=222 1=9 w=39 att = 1
   1.12   nontext index = 4 x=424 y=245 1=24 w=92 att = 40
       1.12.1  nontext index = 1 x=462 y=253 1=11 w=46 att = 81

1.13      nontext index = 5 x=39 y=277 1=352 w=474 att = 8
   1.13.1   index = 1 x=51 y=288 1=12 w=19 att = 1
            x=51 y=288 1=12 w=19 att = 1
   1.13.2   index = 2 x=105 y=286 1=12 w=33 att = 1
            x=105 y=286 1=12 w=33 att = 1
   1.13.3   index = 3 x=223 y=284 1=13 w=69 att = 1
            x=223 y=284 1=13 w=69 att = 1
   1.13.4   index = 4 x=365 y=281 1=22 w=30 att = 1
            x=365 y=281 1=22 w=30 att = 1
   1.13.5   index = 5 x=434 y=281 1=21 w=52 att = 1
            x=434 y=281 1=21 w=52 att = 1
   1.13.6   index = 6 x=51 y=315 1=10 w=6 att = 1
            x=51 y=315 1=10 w=6 att = 1
   1.13.7   index = 7 x=90 y=313 1=11 w=43 att= 1
            x=90 y=313 1=11 w=43 att = 1
   1.13.8   index = 8 x=173 y=314 1=12 w=110 att = 1
            x=173 y=314 1=12 w=110 att = 1
   1.13.9   index = 9 x=376 y=315 1=10 w=35 att = 1
            x=376 y=315 1=10 w=35 att = 1
   1.13.10 index = 10 x=454 y=316 1=12 w=45 att = 1
            x=454 y=316 1=12 w=45 att= 1
   1.13.11 index = 11 x=49 y=333 1=23 w=11 att = 1
            x=49 y=333 1=23 w=11 att = 1
   1.13.12 index = 12 x=89 y=333 1=23 w=43 att = 1
            x=89 y=333 1=23 w=43 att = 1
   1.13.13 index = 13 x=172 y=333 1=24 w=4 att = 1
            x=172 y=333 1=24 w=84 att = 1
   1.13.14 index = 14 x=368 y=334 1=23 w=44 att = 1
            x=368 y=334 1=23 w=44 att = 1
   1.13.15 index = 15 x=454 y=348 1=9 w=45 att = 1
            x=454 y=348 1=9 w=45 att = 1
   1.13.16 index = 16 x=420 y=549 1=73 w=90 att = 1
            x=420 y=549 1=73 w=90 att = 1

FIG.8b-2

PRE-PRODUCTION DEFINITION
PRODUCTION PROCESSING
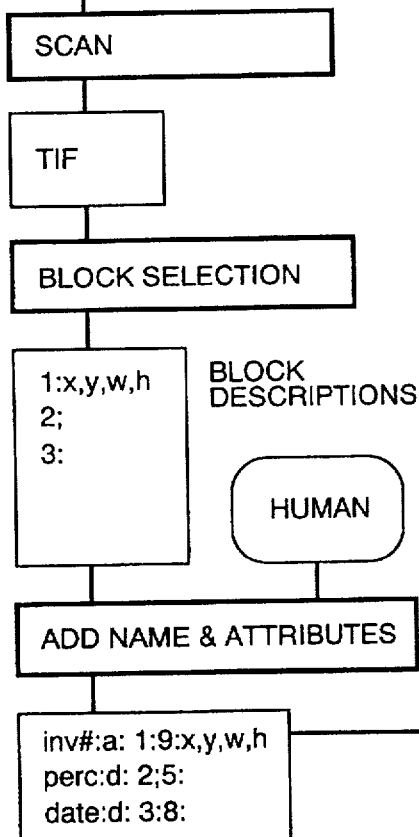
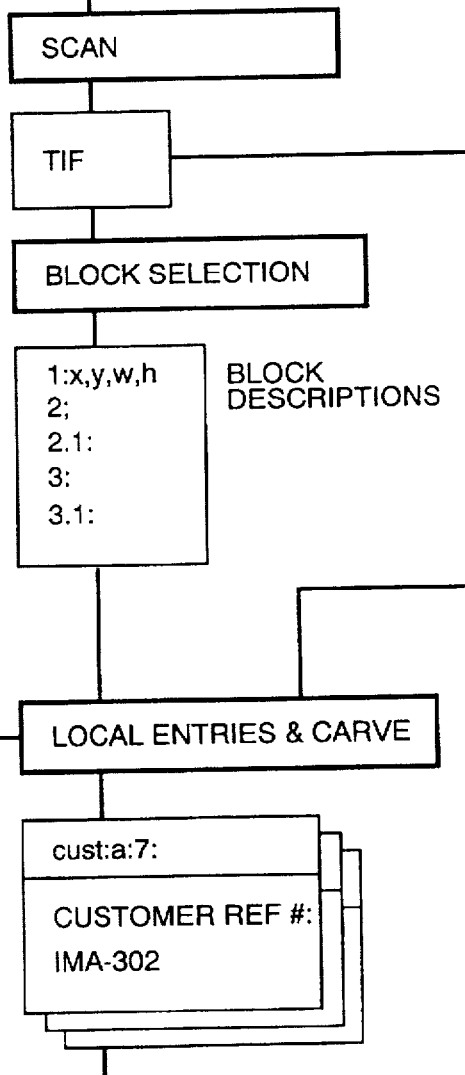
FIG.10a
STORAGE AND/OR OCR OR DATA ENTRY

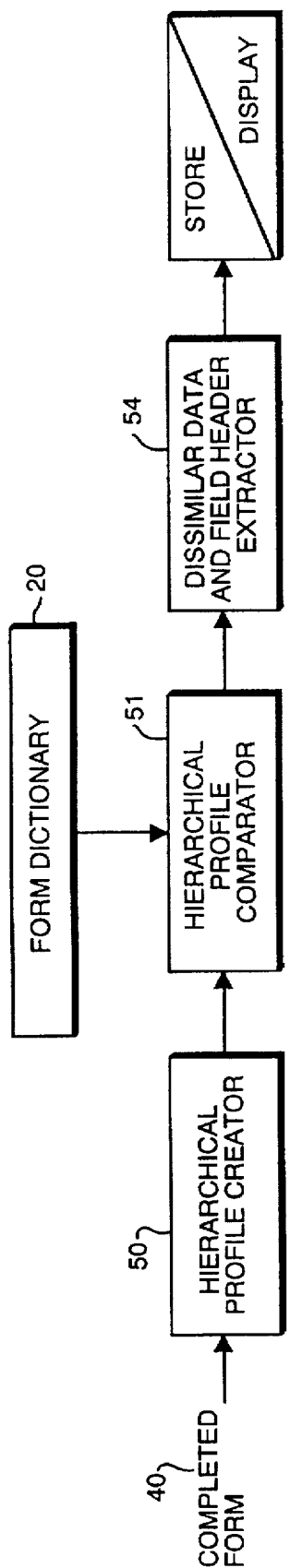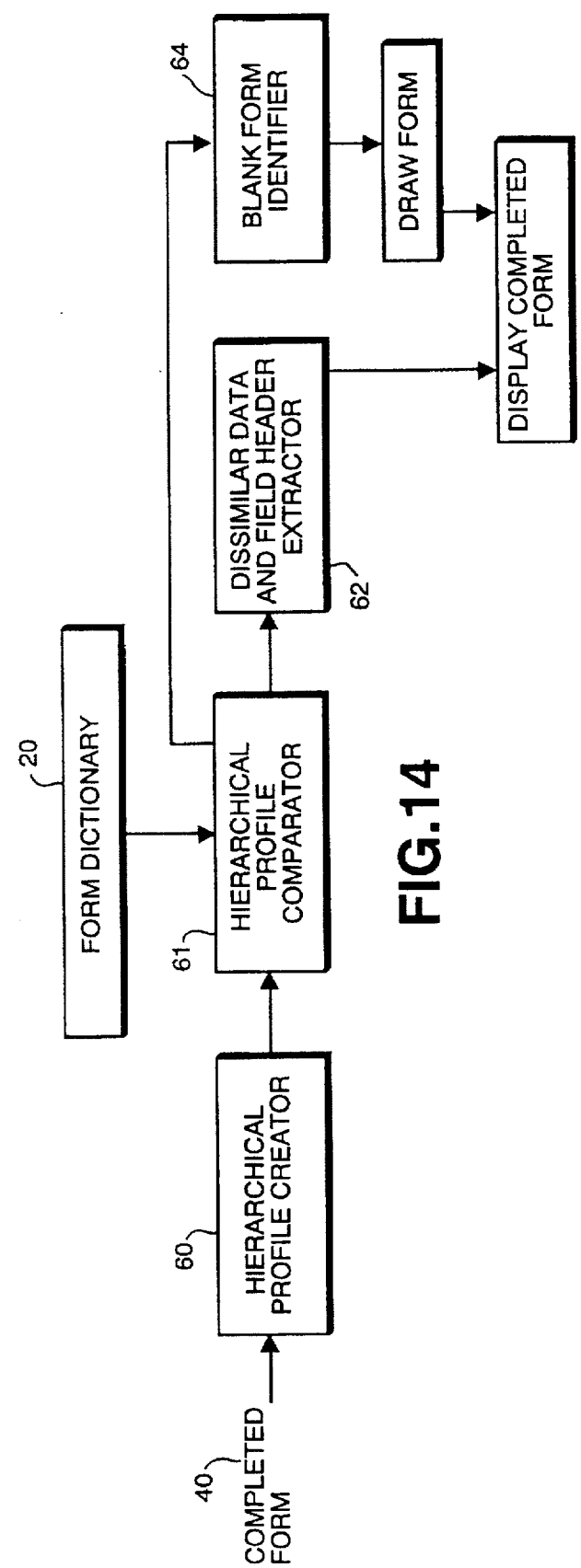

FORM IDENTIFICATION AND PROCESSING SYSTEM USING HIERARCHICAL FORM PROFILES

This application is a continuation of application Ser. No. 08/156,705 filed Nov. 24, 1993, abandoned.

BACKGROUND OF THE INVENTION

1. Field of the Invention

The present invention relates to retrieval and to processing of data from completed printed forms. In particular, the present invention relates to a method and apparatus which uses feature extraction techniques to identify features in the completed forms and which, based on the features identified in the form, locates desired data, extracts the desired data, stores the desired data in memory and, if necessary, displays the extracted data to an operator for post-processing.

2. Description of the Related Art

Data entry and retrieval systems, such as a Document Image Management System, are widely used to enter data from completed printed document forms. Generally, such systems are designed to process data from various types of completed forms, such as credit forms, insurance forms, survey forms, hospital forms, etc. In order to process many different types of forms, system operators manually sort through the forms and separate the forms into batches of similar forms. Once the various types of forms have been sorted and separated into similar batches, a batch of the same type of completed form is distributed to a data entry operator for manual input of data from the completed form into a central processing system. During the data entry process, the operator reviews a completed form, determines the data which is to be manually keyed-in, and manually keys-in data from each completed form into the central processing system.

In order to save time, a more sophisticated manner of paperless sorting has sometimes been adopted. Using paperless sorting, a completed form is digitally scanned and a digital image of the form is stored. Once the digital image of the completed form is stored in memory, it can be identified by either data entry operators or by an automatic sorting process which first locates a coded "indicia field" such as a bar code field on the printed form and subjects the indicia field to suitable processing. Once the completed form is recognized, the form is automatically sorted and routed to the appropriate data entry operator workstation for further processing as described above.

Despite the advantages of paperless sorting, both the manual system and the paperless sorting system suffer from disadvantages in that both systems consume a great amount of time to sort and to manually enter data from the completed form. In addition, companies which utilize automatic sorting practices by scanning all completed forms utilize large amounts of mass storage. These companies are therefore limited by the amount of mass storage available for storing images of completed forms. Even though storing an entire image of a completed form cuts down on the number of man-hours used to manually sort through completed forms, the amount of mass storage increases exponentially. In this regard, since only a small portion of a completed form contains desired data, a large portion of memory is wasted by storing redundant elements in each completed form, such as the blank printed form itself, and captions like name, date, address, etc. Image data which includes unused portions, or "null fields", and "white space" waste additional mass storage as well. Thus, a large portion of mass storage is utilized for useless data and/or non-data storage.

Heretofore, it has not been possible to automatically input various types of completed printed forms, extract the desired data from the completed forms and, if desired, display only the completed data to an operator. That is, conventionally, once a completed document has been sorted and stored, an entire document must be displayed to an operator so that the operator can enter the desired data from the completed form. Consequently, data entry and retrieval are both time-consuming and costly.

SUMMARY OF THE INVENTION

It is an object of the present invention to address the foregoing difficulties.

In one aspect of the present invention, a method for recognizing completed forms includes the steps of scanning a plurality of different types of blank printed forms, using feature extraction techniques to create a hierarchical profile for each scanned blank form, enhancing and modifying each blank form profile by eliminating similarities between each blank form profile, and storing the enhanced blank form profiles in a form dictionary. In the method for recognizing completed forms, a completed form is scanned and a hierarchical profile for the completed form is created using the same feature extraction techniques such as those used to create the forms dictionary. The completed form profile is compared to each of the blank form profiles in the form dictionary until such time that the hierarchical profile of the completed form is identified as one of the blank forms from the blank form dictionary.

In a related aspect of the invention, there is a method for displaying data from a completed form using the same feature extraction techniques to the form dictionary. A completed printed form is scanned and a hierarchical profile for the completed form is created. The completed form profile is compared with each of plural blank form profiles in a form dictionary until the completed form is identified as one of the blank forms in the dictionary. Upon identifying the completed form, the completed form profile and the blank form profile are compared and, based on the comparison, dissimilar image data from the completed form profile is extracted and stored for display to an operator. Because only dissimilar data is displayed to an operator, the operator can more easily recognize what data is to be keyed-in. If desired, field identifiers may also be displayed.

In yet another aspect of the invention, a method for storing completed portions of a form includes the steps scanning a completed printed form, creating a hierarchical profile of the completed form using the same feature extraction techniques as those used to create the form dictionary, comparing the completed form profile with stored blank form profiles, identifying a stored blank form profile as that of the completed form profile based on the results of comparison, comparing the blank form profile with the completed form profile and extracting dissimilar data from the completed form profile, storing the extracted dissimilar data, and reassembling the completed form by displaying the identified blank form and overlaying the dissimilar data at the appropriate locations within the form.

This brief summary of the invention is provided so that the nature of the invention may be understood quickly. A fuller understanding may be obtained by reference to the following detailed description of the invention in connection with the appended drawings.

BRIEF DESCRIPTION OF THE DRAWINGS

FIG. 4a is an example of a blank form used with the present invention;

FIG. 4c is an illustration of a hierarchical form profile of vectorized data;

FIG. 6 is an example of a completed form used with the present invention;

FIG. 8b, comprising 8b-1 and 8b-2, is an illustration of a computer-usable format of a vectorized version of the completed form shown in FIG. 6;

FIG. 10a is a functional block diagram of a method for extracting desired data and field header information from completed forms;

FIG. 11 is a general block diagram of the process for extracting and for displaying desired data from a completed form;

FIG. 14 is a general block diagram of the process for extracting data from a completed form, storing an indicia of a corresponding blank form, and recreating the completed form.

DETAILED DESCRIPTION OF THE PREFERRED EMBODIMENT

Figure 1:
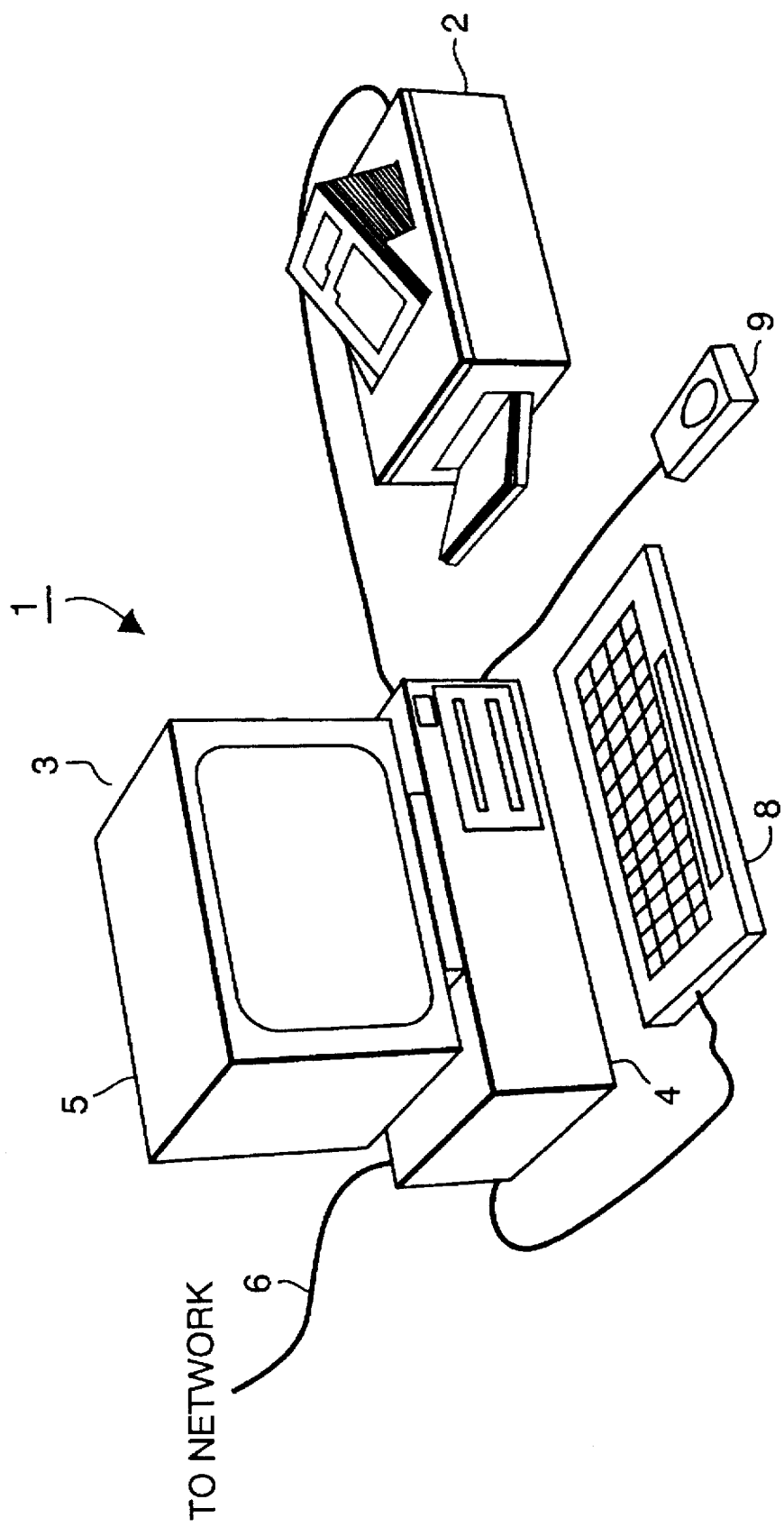
FIG. 1 is a representational view of a network system for capturing images from completed forms.

FIG. 1 illustrates a network system for extracting and for storing desired data from completed forms.

As shown in FIG. 1, reference numeral 1 designates a document image management system. Document image management system 1 includes document scanner 2 for scanning printed forms, including blank printed forms and completed printed forms. Document scanner 2 creates digital image data from scanned forms and outputs the image data to workstation 3.

Workstation 3 includes computing equipment such as an IBM PC or PC-compatible computer 4. Workstation 3 further includes a local area network interface 6 which provides interface to the local area network, whereby workstation 3 can access image data files stored thereon. Workstation 3 can either store input image data created by document scanner 2 or downput the image data to a file server (not shown) located on the local area network. Workstation 3 also includes keyboard 8 and mouse 9 for allowing user designation of areas on display screen 5.

Figure 2:
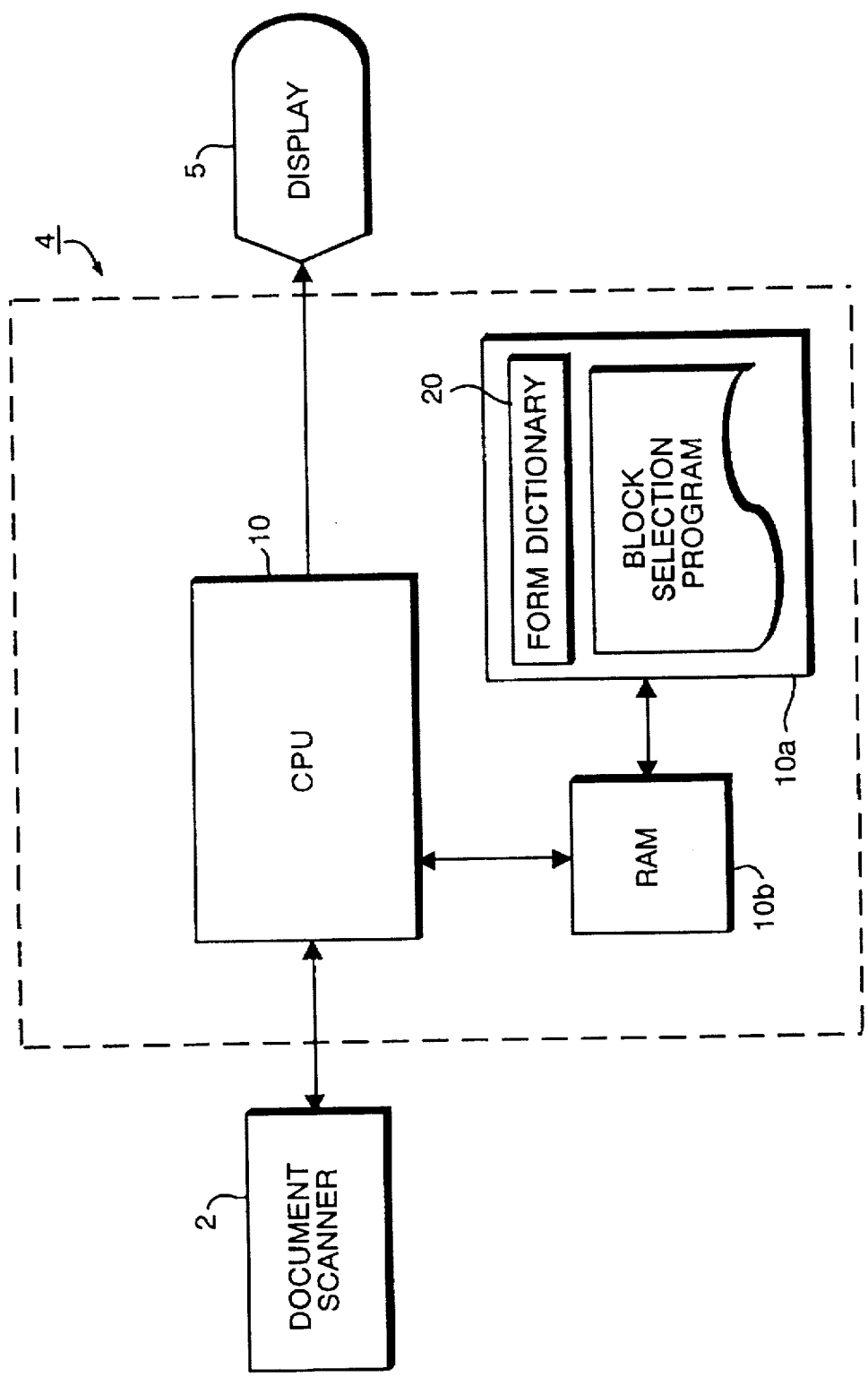
FIG. 2 is a block diagram of the data entry and retrieval system of the present invention.

As shown in FIG. 2, PC 4 includes CPU 10 such as an 80386 processor which executes stored program instructions such as operator selected application programs that are stored on hard drive 10a. The document image data created by document scanner 2 is received by PC 4 and, prior to processing, PC 4 temporarily stores the image data in a temporary storage area, such as random access memory 10b (RAM). Upon storing the image data in RAM 10b, CPU 10 executes a feature extraction program stored in hard drive 10a. CPU 10 processes the image data in accordance with the feature extraction program. The processed data is compared with forms stored in form dictionary 20 (to be discussed below). Thereafter, the result of comparison is displayed on display screen 5.

Prior to utilizing the data retrieving process from workstation 3, workstation 3 must be initially equipped with a form dictionary. That is, workstation 3 must create a form dictionary of all forms used with the system. This process of creating a form dictionary includes scanning each type of blank form used in the data retrieving system and storing a hierarchical form profile of vectorized data in the form dictionary for each form.

Figure 3:
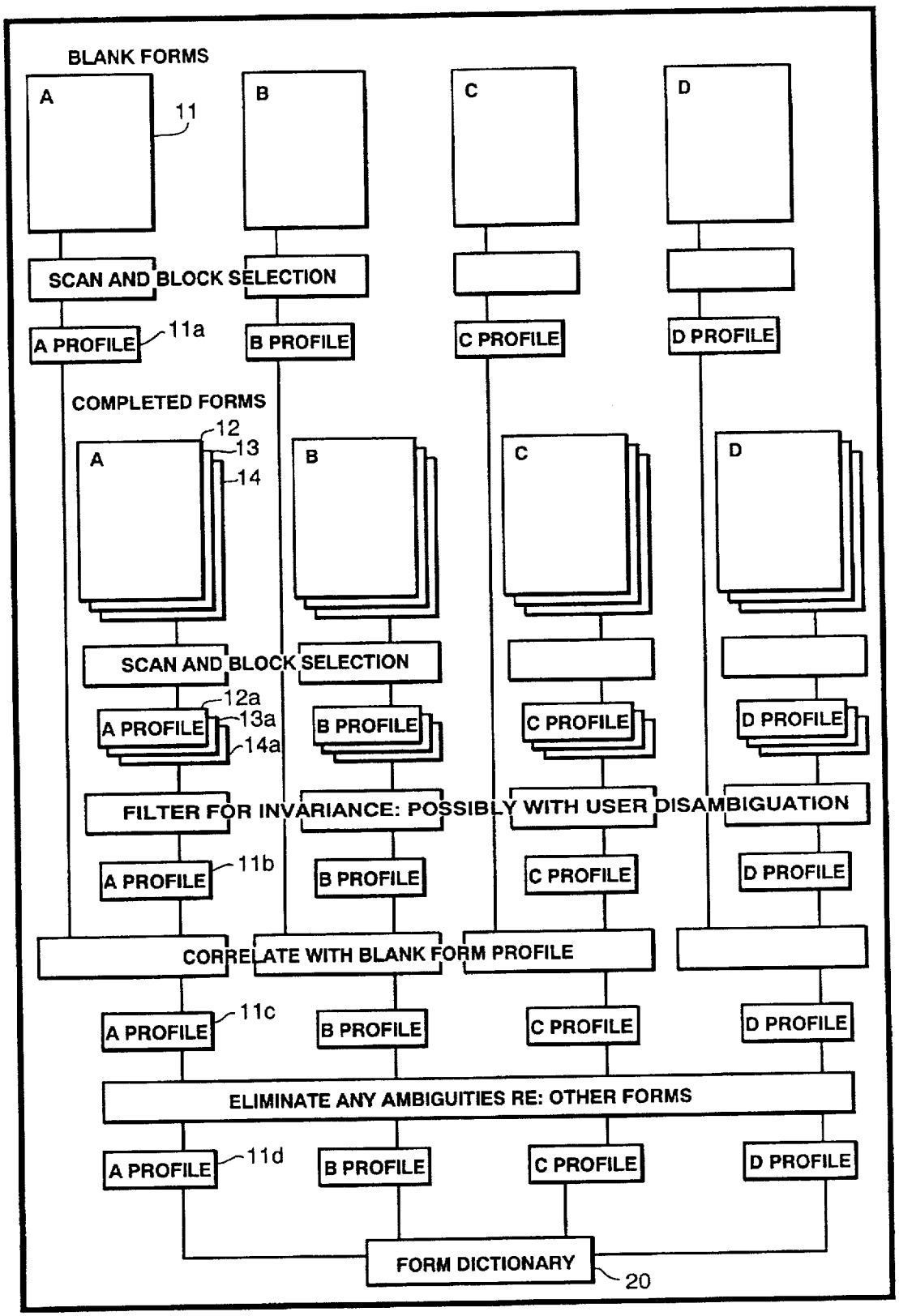
FIG. 3 is a functional block diagram of a method for producing a blank form dictionary in the present invention.
Figure 4B:
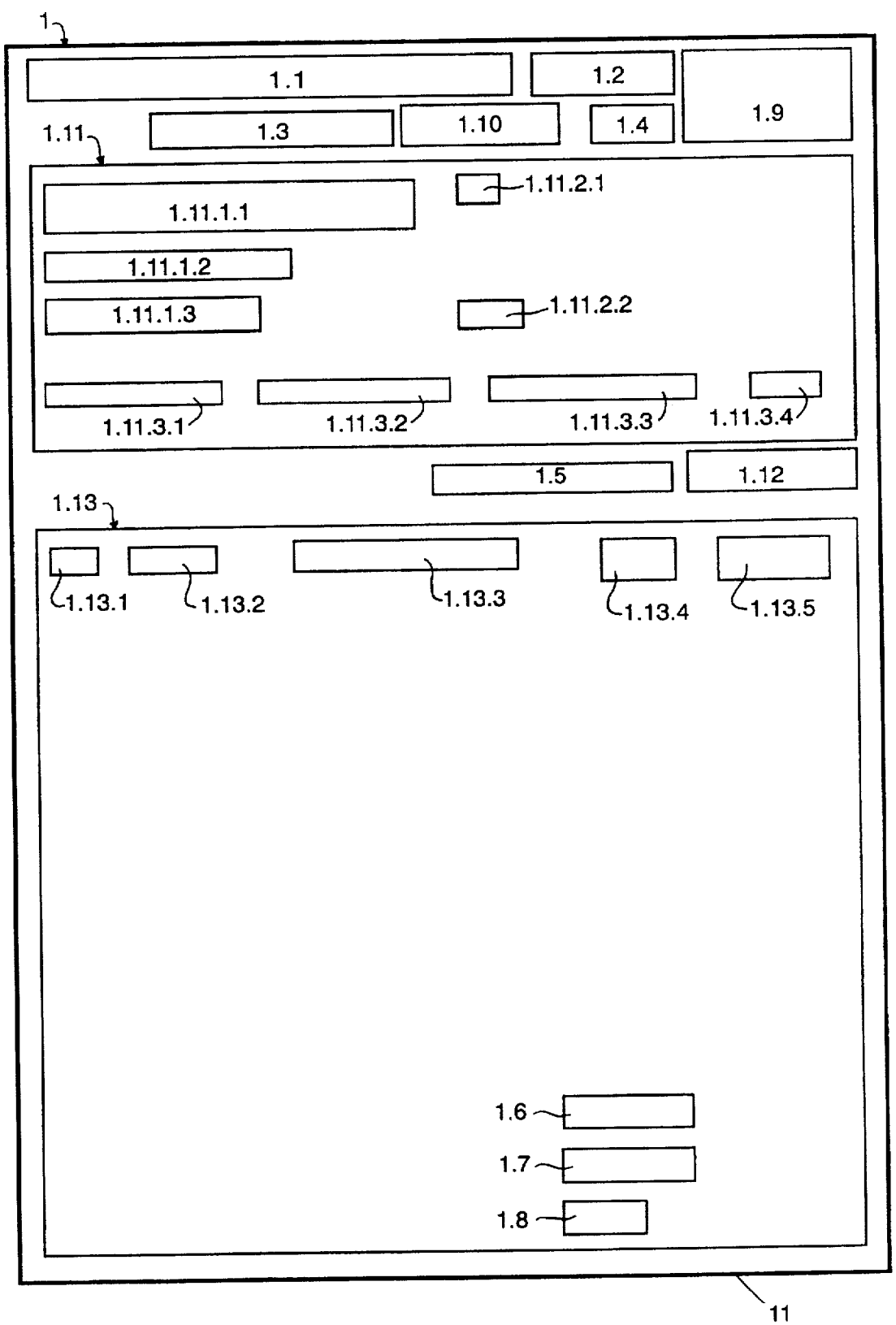
FIG. 4b is a topographical view of a blank form template used in feature extraction.
Figure 5:
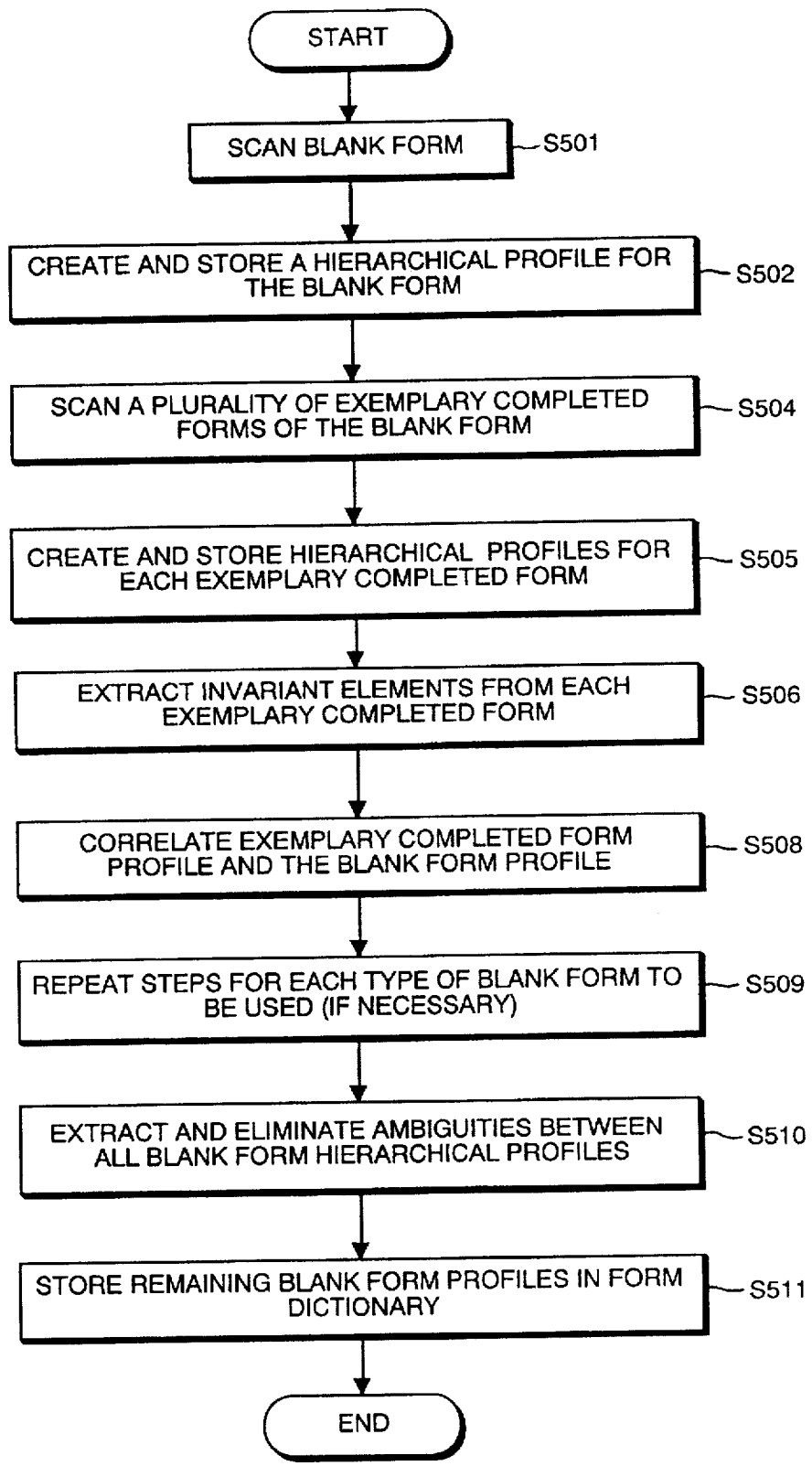
FIG. 5 is a flow chart describing the method for creating a blank form dictionary.

FIGS. 3-5 discuss in greater detail the manner by which form dictionary 20 is created.

FIG. 3 is a functional block diagram illustrating the method for producing form dictionary 20. As shown in FIG. 3, a plurality of blank form types (A, B, C, and D) are scanned by scanner 2 in order to input image data for processing. Since the method of producing a form dictionary is the same for each blank form type, the following description of the method for constructing form dictionary 20 will be discussed only with respect to blank form 11 shown in FIG. 4a for the purposes of brevity.

In FIG. 4a, blank form 11 is input by document scanner 2. Document scanner 2 produces image data which is output to workstation 3. Upon receiving the image data of blank form 11, the image data is either temporarily stored to a file server on the local area network or stored in RAM 10b of PC 4. Once the entire image data of blank form 11 is received, PC 4 processes the image data in accordance with a feature extraction program, such as the feature extraction technique disclosed in commonly assigned U.S. patent application Ser. No. 07/873,012, the contents of which are incorporated herein by reference, or any other suitable type of feature extraction process which creates a hierarchical profile. The stored feature extraction program is retrieved from hard drive 10a and stored in RAM 10b. Once the program is stored, CPU 10 executes the process steps from RAM 10b for execution.

Upon initiation of the program, the feature extraction program designates data blocks within form 11 in order to form a blank form template of blank form 11, as shown in FIG. 4b. Each data block on the blank form template is designated by an index number, (x, y) coordinates, a length measurement and a width measurement of the block. For example, the heading "Canon Information Systems: INVOICE" in FIG. 4a is designated in FIG. 4b as block 1.1 for "Canon Information Systems" and as block 1.2 for "INVOICE".

Once the template has been created, a computer-usable format is generated from the template by the feature extraction program to create a hierarchical form profile of vectorized data. As shown in FIG. 4c, the computer-usable format 11a of blank form 11 is created by identifying the block location with (x, y) coordinates, a length measurement, a width measurement, and an attribute of the block. The attribute information relates to the type of information in the block, such as text, graphics, etc.

In some instances, a block, such as block 1.11, which includes both routing information and identification information, is divided into sub-blocks. For example, as shown in FIG. 4b, block 1.11 is divided into several sub-blocks, such as block 1.11.3.1 which designates a customer reference number. Block 1.11.3.1 is defined in FIG. 4c as x=45, y=198, l=13, w=435, and att=1.

Reverting to FIG. 4a, hierarchical form profile 11a has been created and stored as vectorized data, several exemplary completed forms of blank form 11 are scanned and input into the system. Each exemplary completed form 12, 13, and 14 is processed by the feature extraction program in order to create a completed form profile of vectorized data for each completed form. Upon creating completed form profiles 12a, 13a, and 14a, completed form profiles 12a, 13a, and 14a are compared and invariant elements are extracted. The invariant elements are summarized to create completed form profile 11b. Blank form profile 11a of blank form 11 and completed form profile 11b are correlated to produce a blank form profile 11c. Blank form profile 11c is stored as vectorized data in form dictionary 20. In the case that more than one blank form is used in the system, the above process is repeated for each type of blank form used in the system.

In the case that the system utilizes plural blank forms, the resulting form profiles (corresponding to form profile 11c) are post-processed to eliminate any ambiguities between form profiles. Once the ambiguities are eliminated, each blank form profile is stored in form dictionary 20. Upon completing blank form dictionary 20, the data entry system is prepared to identify and to store data from completed forms.

The flow chart in FIG. 5 illustrates in greater detail the process of constructing form dictionary 20. In step S501, a blank form is scanned and image data is created and sent to workstation 3. The image data is processed by PC 4 using the feature extraction program stored on the hard drive 10a. The feature extraction program creates a template of blank form 11 from which computer-usable vectorized data for a blank form profile can be created. As previously discussed, with respect to FIG. 4c, the hierarchical form profile includes vectorized data which defines the block by an index number, (x, y) coordinates, a length measurement, a width measurement, and attribute information which defines the type of block, i.e., text, table, graphics, etc.

After creating the hierarchical form profile in step S502, a plurality of exemplary completed forms 12, 13, and 14 of blank form 11 are scanned by scanner 2 in step S504. In step S505, the feature extraction program operates to create hierarchical form profiles of vectorized data for each completed form. In step S506, each completed form profile is compared and invariant elements in each completed form profile are extracted. The extracted invariant elements are correlated to create an exemplary completed form profile 11b.

Blank form profile 11a and exemplary completed form profile 11b are correlated to form blank form profile 11c in step S508. In the case that more than one blank form is used in a data system, flow proceeds to step S509 in which steps S501–S508 are repeated for each blank form used in the system.

In step S510, each different form profile is post-processed by removing any ambiguities between all form profiles. The resulting disambiguated hierarchical form profile is stored in form dictionary 20 in step S511. Once form dictionary 20 is complete, form dictionary 20 contains all the information required to distinguish between forms. If two different forms have the same hierarchical structure, each form is subjected to OCR processing in order to identify a feature of the form which in most cases will be different from any other form, such as a form number located at the bottom of the form. This process is usually a post-processing step which is operator assisted in order to eliminate similar features in different forms. Upon completing the foregoing steps, form dictionary 20 is complete.

Once form dictionary 20 has been created, completed forms can be identified and desired data extracted from completed forms. For example, FIG. 6 illustrates an example of completed form 40. As shown, only a small portion of form 40 includes desired data. That is, it is desirable, and more efficient to extract only information regarding certain items, such as invoice number, dates, description of items, quantity, and prices. The remaining information on the form is deemed to be useless data and, therefore, it is not extracted.

In order to obtain and to limit the amount of data extracted, completed form 40 is subjected to an identification process. In accordance with the identity of the completed document, a data extraction process extracts preselected data fields from the completed form.

Figure 7:
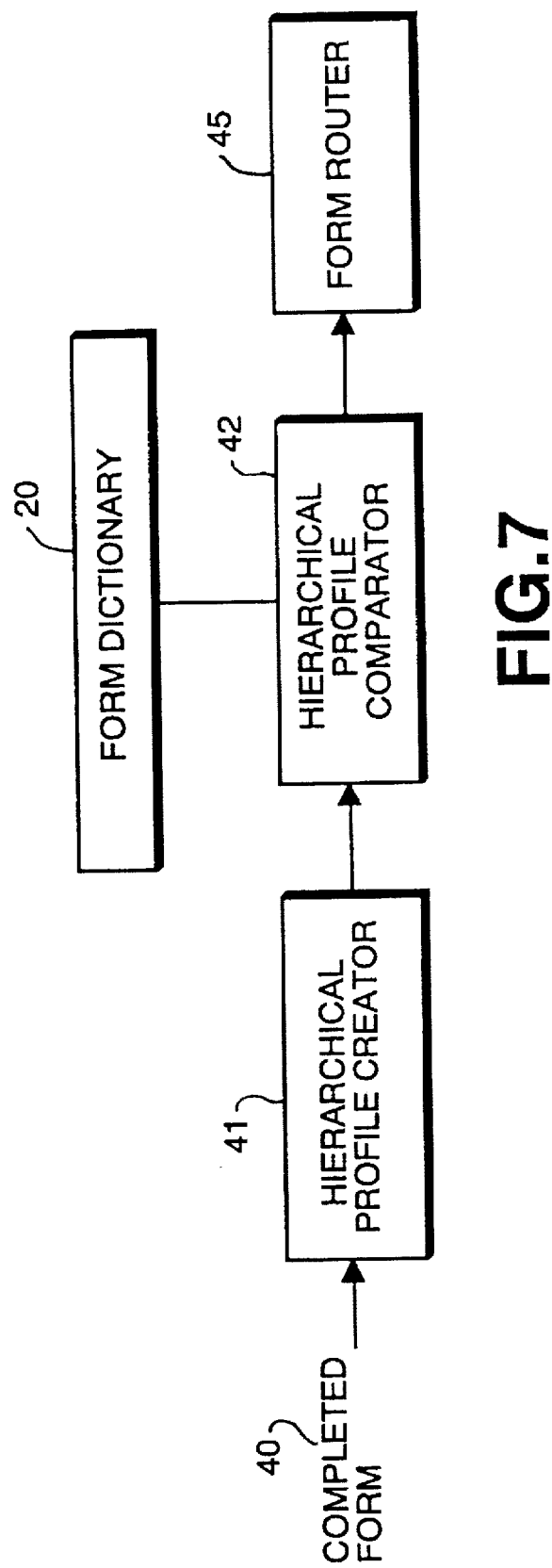
FIG. 7 is a general block diagram of the process for identifying and for routing completed forms.

FIG. 7 is a general block diagram illustrating the process for identifying, extracting and routing the identified form. As shown in FIG. 7, image data of completed form 40 is processed to create a hierarchical profile of vectorized data by hierarchical profile creator 41 using the same feature extraction method for creating form dictionary 20. The created hierarchical profile is compared with hierarchical profiles of forms stored in form dictionary 20 by hierarchical profile comparator 42. Hierarchical profile comparator 42 identifies a corresponding form in form dictionary 20 and, in accordance with the identity of that form, image data of completed form 40 is routed to an appropriate processing station by form router 45.

Figure 8A:
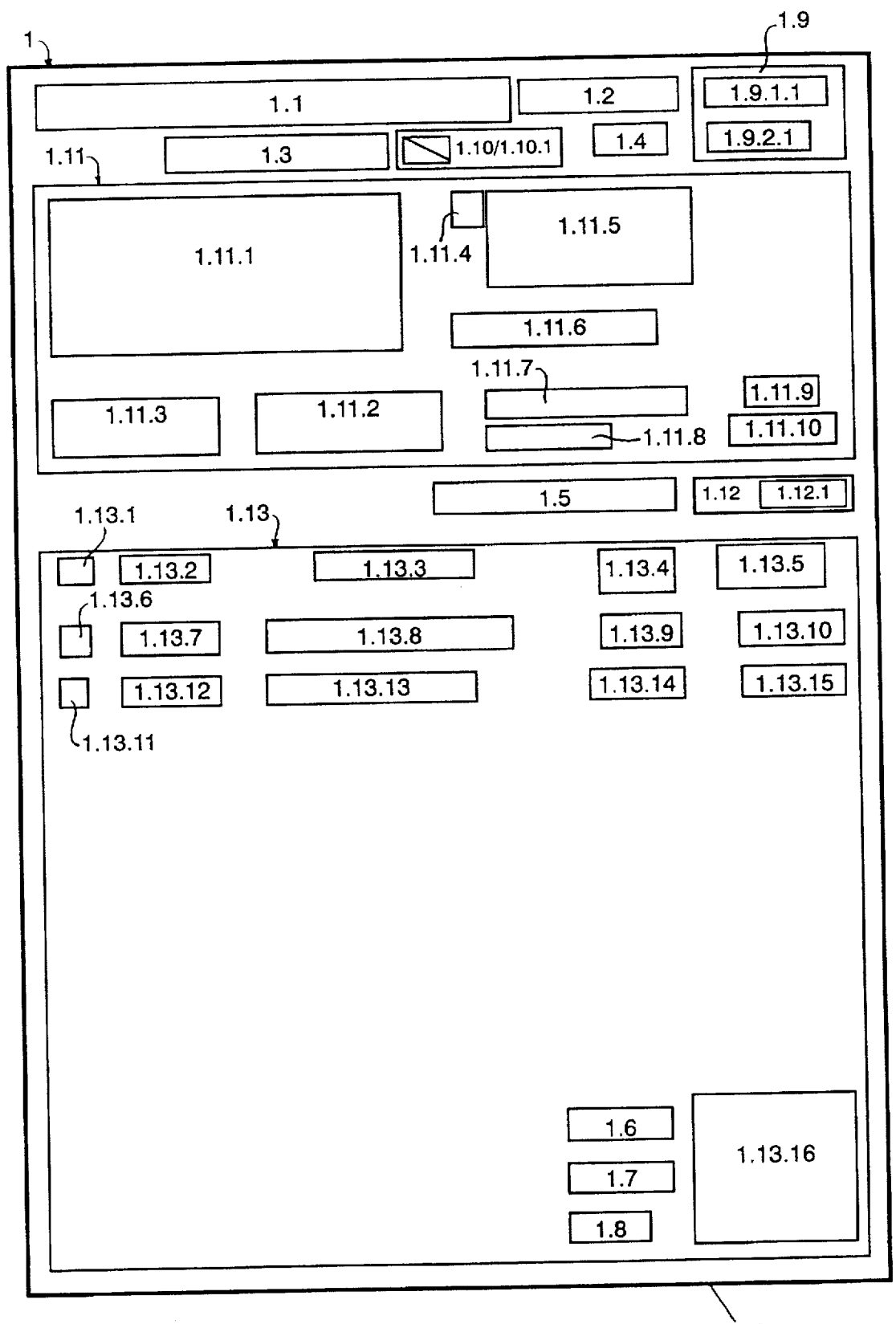
FIG. 8a is a topographical view of a completed form template of the completed form shown in FIG. 6.

In more detail, to extract desired data, the feature extraction program forms a completed form template of completed form 40 as shown in FIG. 8a. The template facilitates the process for creating the vectorized data which defines the completed form in FIGS. 8b-1 and 8b-2. Once the completed form is identified, PC 4 determines, in accordance with the identity of the completed form, where to route the completed form for further processing.

Figure 9:
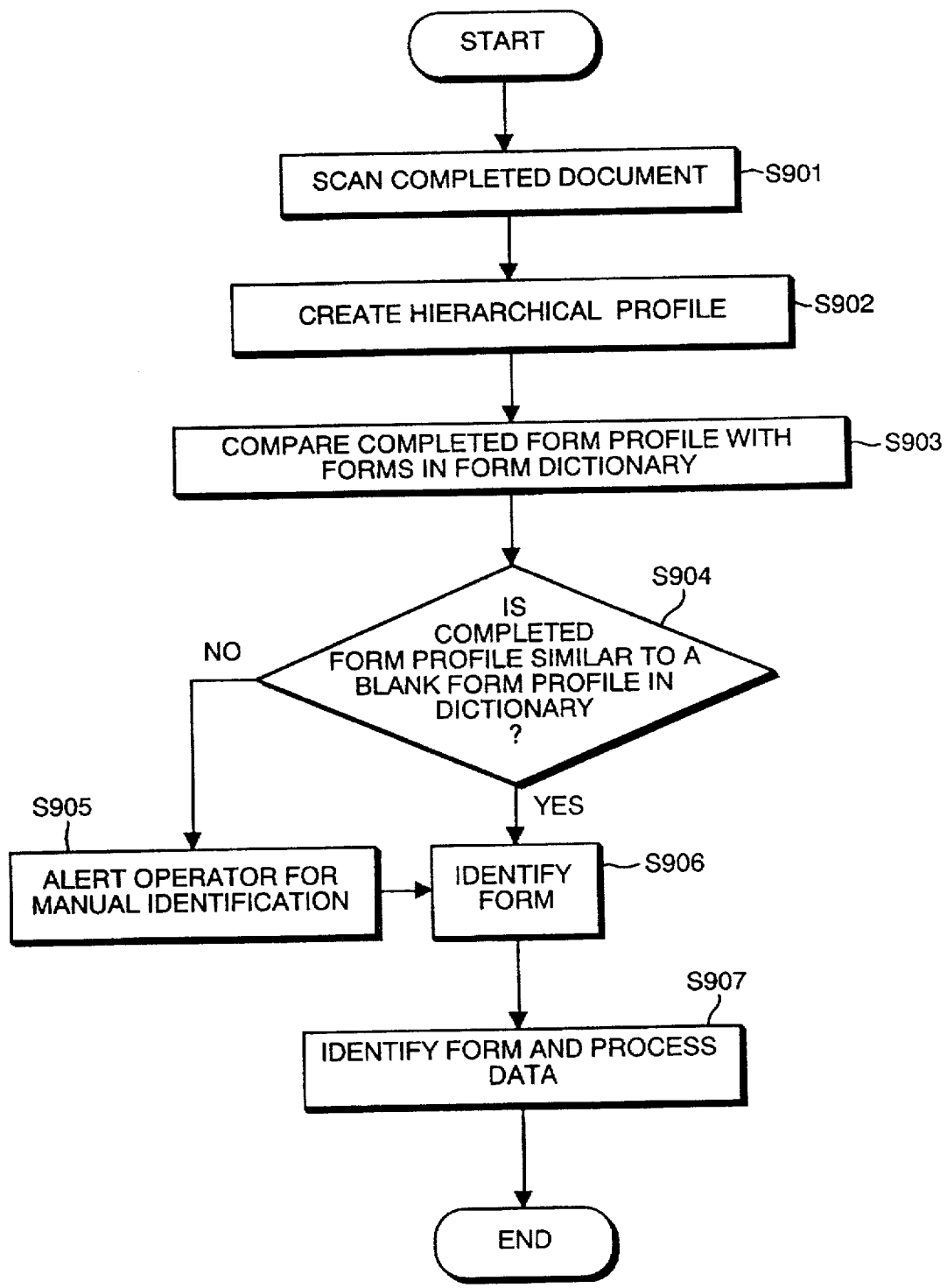
FIG. 9 is a flow chart describing the method for retrieving desired data from the completed form shown in FIG. 6.

The method for identifying a completed form and extracting desired data will be discussed in greater detail with respect to the flow chart illustrated in FIG. 9.

In step S901, completed form 40 is scanned and image data of completed form 40 is output to workstation 3 for processing. PC 4 in workstation 3 processes the image data of completed form 40 in accordance with a stored feature extraction technique. The feature extraction program operates to divide completed form 40 into blocks and creates a hierarchical form profile in step S902. The completed form profile includes vectorized data defining the block layout of completed form 40. The completed form profile shown in FIGS. 8b-1 and 8b-2 is compared with blank form profiles in form dictionary 20 in step S903. Invariant elements between the completed form profile and the form profiles in form dictionary 20 are compared in step S903.

In step S904, CPU 10 determines whether a predetermined level of invariant elements has been identified between the completed form profile and at least one blank form profile in form dictionary 20. In the case that the number of invariant elements does not reach the predetermined level, in step S905 the data entry operator is alerted that the form has not been identified and the completed form is rejected for manual identification by the operator or the unidentified form can be subjected to OCR.

In step S906, the form is identified by either the operator or by CPU 10. That is, CPU 10 selects the blank form profile having the greatest number of invariant elements in common with the completed form profile. This blank form profile is determined to be the corresponding form to the completed form.

Upon identifying the form, the completed form is routed in accordance with its particular identity in step S907. For example, a completed form may be routed to the personnel department if the form is an employment application; to the claim department if the form is an insurance claim form, etc. On the other hand, the completed form may be routed for further processing, such as extracting particular data fields from certain portions of the form and subjecting those extracted fields to optical character recognition.

In addition to routing particulars, completed documents may be submitted for further processing since some completed documents contain several types of data. For example, a completed document may be a hybrid document which contains image, text, graphs, etc., and, therefore, the text portion is subjected to a different recognition process than an image. That is, text is generally subjected to optical character recognition while the image is generally subjected to half-tone processing.

A second embodiment of the present invention is to be described with reference to FIGS. 10a and 10b. The invention to be described hereinbelow utilizes form dictionary 20 which has been previously described above and, therefore, details for creating form dictionary 20 will be omitted for the purpose of brevity.

Referring to FIG. 10a, there is illustrated a functional block diagram of a method for extracting predesignated "data fields" and for displaying only those data fields to an operator. As shown in FIG. 10a, a blank form is scanned and a hierarchical profile of the form is created by feature extraction.

An operator, during a preproduction phase of creating a hierarchical profile of a blank form, can designate certain data fields to be extracted from among other data fields in a completed form. In the preproduction phase, data fields within a blank form are designated by an operator for extracting data therein. The designation of each data field is stored with the blank form profile in form dictionary 20. Once the preproduction of the hierarchical form profile has been completed, completed forms are processed.

Upon scanning a completed form, a hierarchical profile of the completed form is created by feature extraction techniques. The completed profile is compared with all hierarchical form profiles in form dictionary 20. Assuming that the completed form is identified as one of the blank forms in the form dictionary, a blank form profile and the completed form profile are compared and dissimilar elements in the completed form profile are extracted.

In accordance with predesignated information, the dissimilar elements and the predesignated fields are compared once again. The dissimilar elements falling within the preselected fields are stored and the remaining dissimilar elements are discarded. The data within the preselected fields are either subjected to further processing or displayed to the data entry operator for manual input.

Figure 10B:
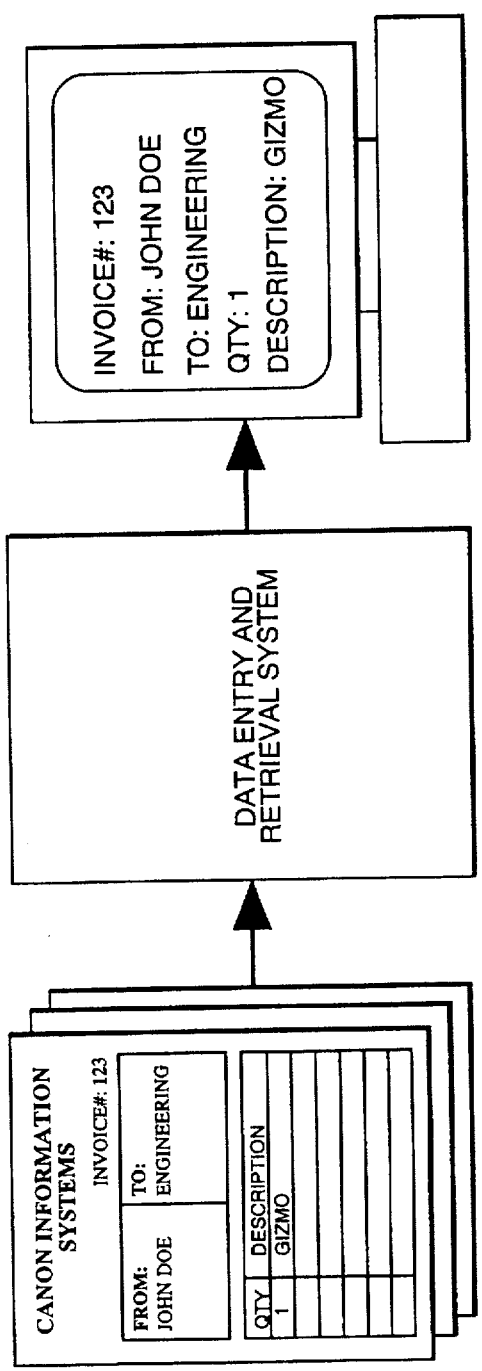
FIG. 10b illustrates an example of extracting and displaying desired data from a completed form.

For example, in FIG. 10b, there is illustrated a completed form which includes, among other items, invoice number, origin and destination information, quantity information, and description information. Because these data fields were predesignated during the preproduction definition stage, data within each field is extracted from the completed form. Accordingly, in order to remove all extraneous items from the form, the form is input into the data entry and retrieval system and, in accordance with the present invention, only the desired information is displayed to the data entry operator for manual-key input. As a result, a data entry operator can reduce the amount of time in reviewing a completed form for useful data.

Thus, as shown with respect to FIG. 11, image data of completed form 40 is processed to create a hierarchical profile by hierarchical profile creator 50. The profile is compared and identified as a hierarchical form profile in form dictionary 20 by hierarchical profile comparator 51. Hierarchical profile comparator 51 compares the identified form from dictionary 20 with the hierarchical profile of completed form 40. Dissimilar data with respective field header information is extracted from the completed form by dissimilar data and field header extractor 54. The extracted data either can be stored or can be displayed immediately to an operator.

Figure 12:
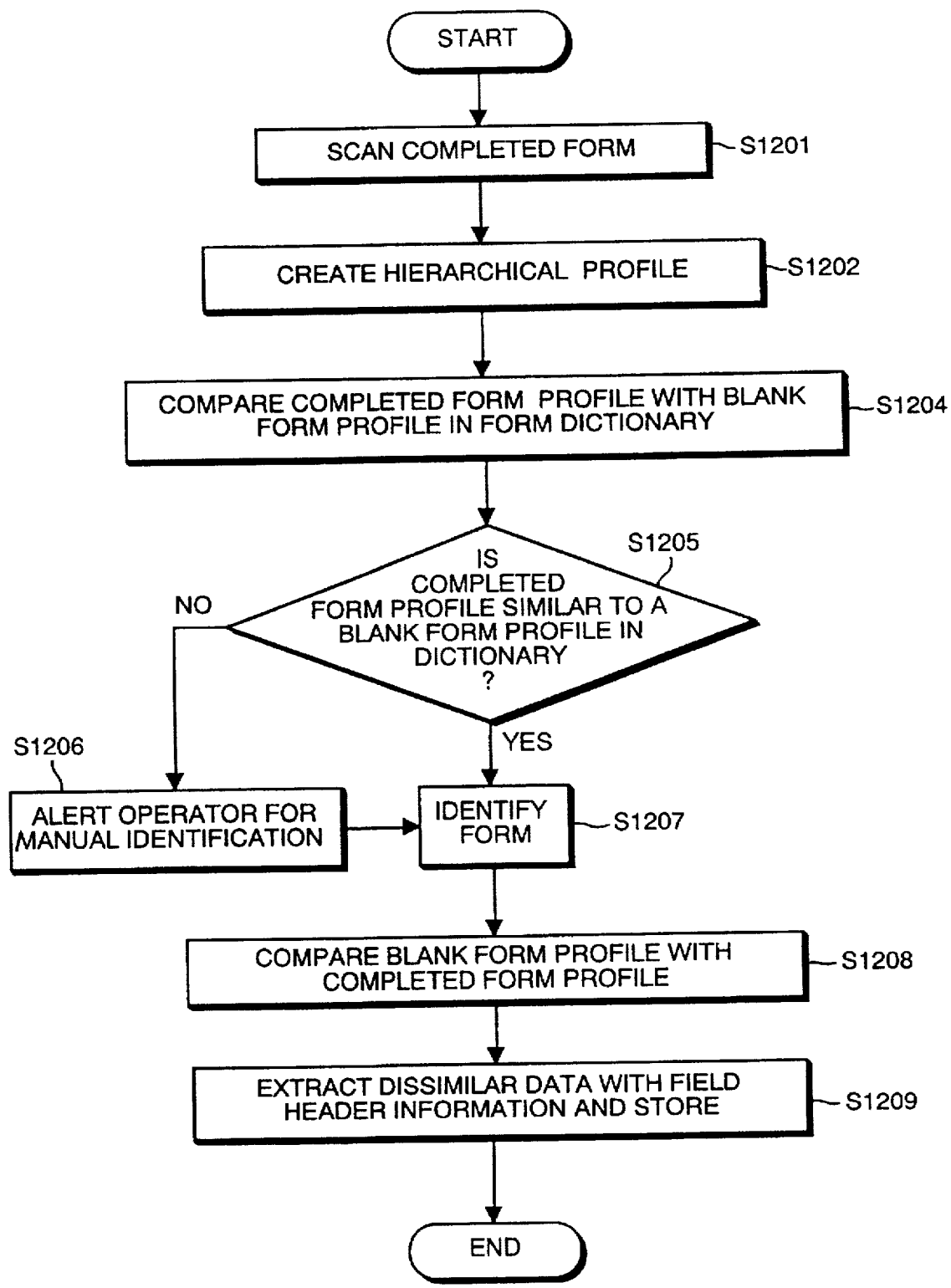
FIG. 12 illustrates a flow chart describing the method for extracting data from completed forms and displaying the extracted data with field header information to an operator in a second embodiment of the present invention.

FIG. 12 discusses in greater detail the process of extracting desired fields from completed forms. In step S1201, a completed document is scanned and the image data is subjected to feature extraction. In step S1202, the feature extraction program creates a hierarchical form profile for the completed form using the same feature extraction techniques used to create form dictionary 20. In step S1204, a completed form profile is compared with each of the blank form profiles in the form dictionary. In step S1205, CPU 10 determines whether there is a match between one of the blank form profiles and the completed form profile.

In the case that a match has not been determined, in step S1206 the data entry operator is alerted that a completed form cannot be identified and the completed form is either manually identified by the data entry operator or the completed form is routed for further processing, such as optical character recognition. In step 1207, the completed form is either identified by the operator or by CPU 10. In step S1208, if the completed form profile is matched with a blank form profile in the form dictionary, the matched blank form profile is compared with the completed form profile. In step S1209, dissimilar elements from the completed form profile are extracted with respective field header information. The extracted information and field header information are stored in memory.

As described above with respect to FIG. 10a, during the preproduction definition of the blank form profile, it may be desirable to predesignate certain fields from which data can be extracted. In this case, the stored data and header information from the completed document profile are compared with the predesignated listing of data fields. Any data fields designated by the predesignated listing are displayed with respective field header information to an operator for manual input. Otherwise, if no predesignated listing exists, all extracted data with respective field header information is displayed to the data entry operator for manual input.

Figure 13:
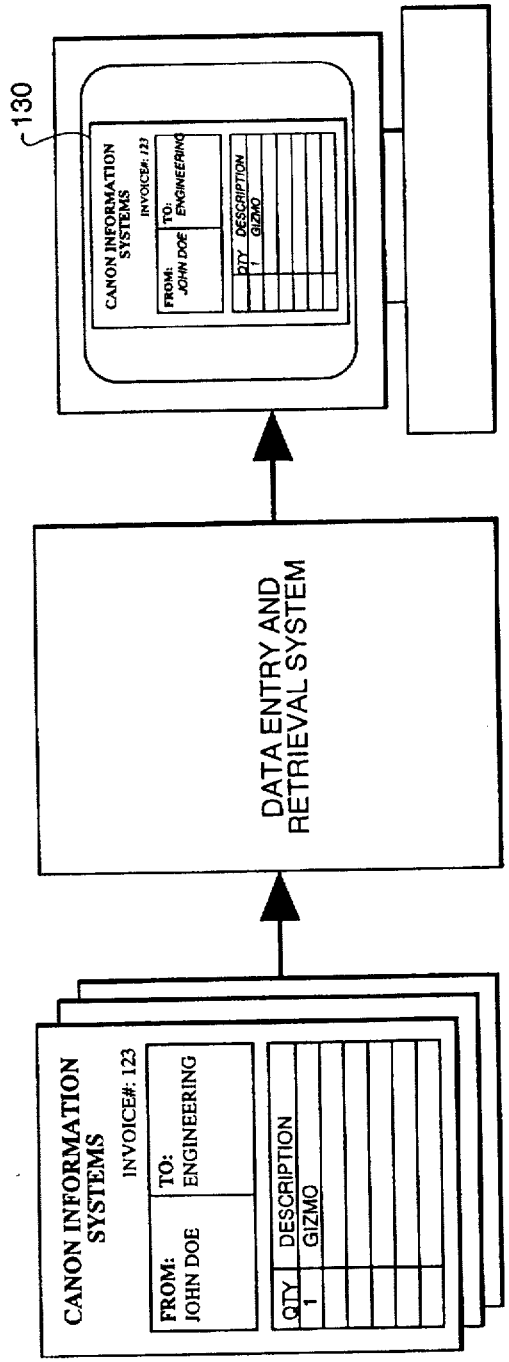
FIG. 13 illustrates an example of recreating a completed form from extracted data and a stored corresponding blank form.

A third embodiment of the present invention is described with reference to FIGS. 13-15. The invention to be described hereinbelow utilizes form dictionary 20 which has been described above.

In the third embodiment of the present invention, it is possible to display an entire completed form without having to store all the image data from the scanned completed form. For example, as shown in FIGS. 13 and 14, completed form 40 is input into the data entry and retrieval system. Using the same feature extraction techniques used for creating form dictionary 20, image data of completed form 40 is processed into a hierarchical form profile consisting of vectorized data and attribute data by hierarchical profile creator 60. The hierarchical profile of completed form 40 is compared with hierarchical profiles of forms stored in form dictionary 20 by hierarchical form comparator 61. Hierarchical form comparator 61 identifies the completed form as one of the forms in form dictionary 20. The corresponding form and completed form are compared and dissimilar data with respective field header information are extracted from the completed form profile by extractor 62. The extracted dissimilar data with respective header information is stored in form memory. In addition to comparing and to identifying, hierarchical profile comparator 61 sends an indicia of the corresponding form from form dictionary 20 to blank form identifier 64. Blank form identifier 64 stores the form indicia with the extracted data in form memory.

In the case that a data entry operator wishes to retrieve completed form 40 from memory, CPU 10 retrieves the corresponding form from form dictionary 20. CPU 10 draws the blank form in accordance with the stored vectorized data. Upon completing the drawn blank form, extracted data is superimposed into appropriate fields within the blank form. As shown at 130 in FIG. 14, data superimposed into the blank form may be skewed left, right, up or down as a result of scanning, or magnification variations caused by copying of blank forms. To correct skewing, a skewing correction program can be applied to the data before displaying the completed form.

Figure 15:
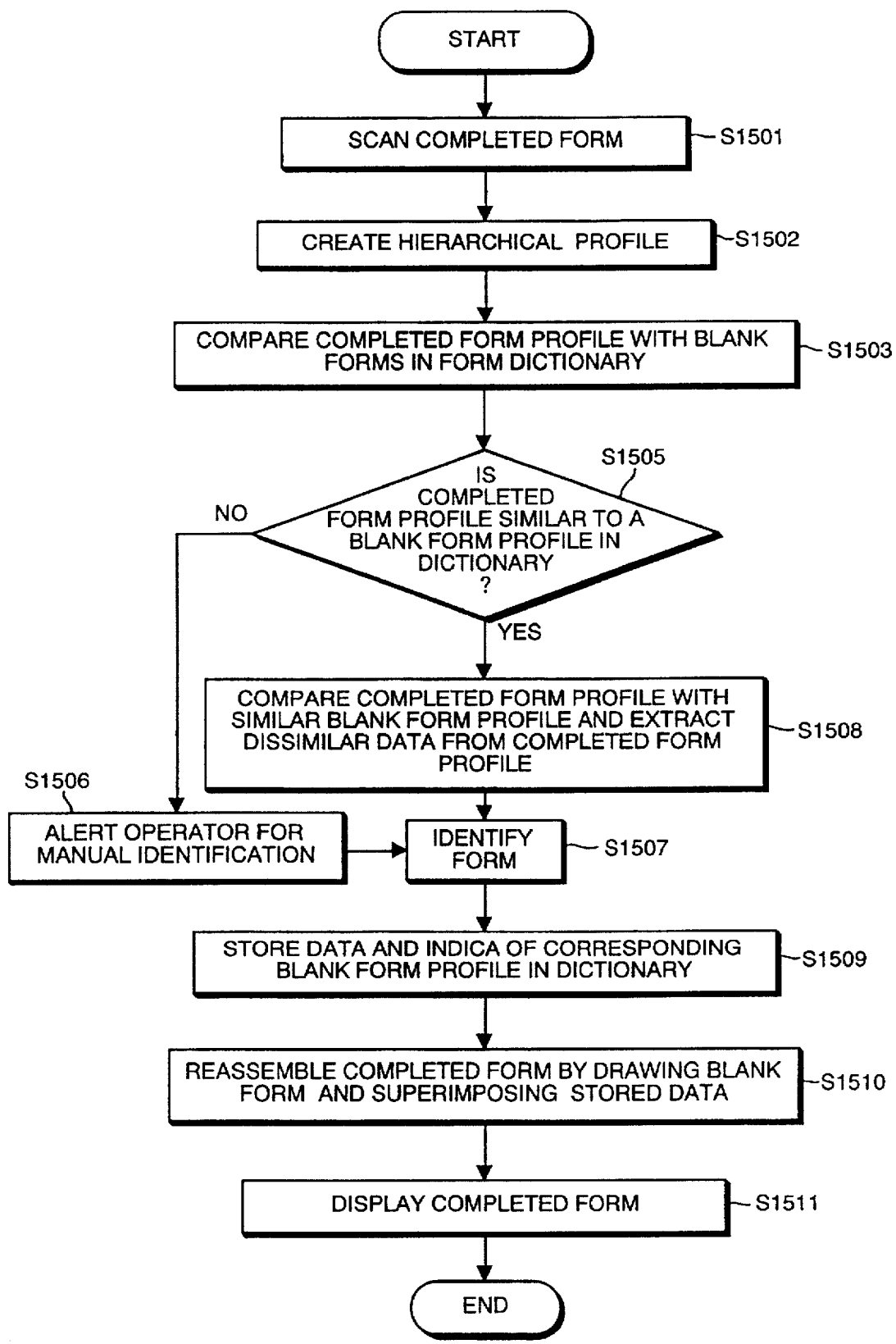
FIG. 15 illustrates a flow chart describing the operation for extracting data from a completed form, storing the extracted data and the identity of a blank form from the form dictionary, and recreating the completed document by displaying the identified blank form superimposed with the extracted data in appropriate field locations of the form in a third embodiment of the present invention.

Referring to FIG. 15, there is illustrated a flow diagram describing a method for identifying a completed form, extracting data from the completed form, storing the extracted data from the completed form with an indicia of a corresponding blank form in the form dictionary, and reassembling the completed form by retrieving the corresponding blank form from memory and superimposing the extracted data from the completed form into the appropriate fields within the blank form.

In more detail, in step S1501, a completed form is scanned and the image data is output to workstation 3 for processing. In step S1502, the feature extraction program in workstation 3 creates a hierarchical profile of the completed form. In step S1503, the completed form profile is compared with each blank form profile in the form dictionary. CPU 10 determines whether a match between the completed profile and a blank form profile in the form dictionary has been identified in step S1505.

In the case that CPU 10 determines that the completed form does not match a blank form in form dictionary 20, then in step S1506 the data entry operator is alerted that no match has been identified for the completed form and the unidentified form is rejected for manual input. In step 1507, the completed form is either identified by the operator or by CPU 10.

In step S1508, the completed form profile and the matched blank form profile are compared and dissimilar elements from the completed blank profile are extracted. The extracted data from the completed form profile is stored with the field header information from which the data was extracted in step S1509. In addition to storing the extracted data and respective field header information, an indicia of the corresponding blank form in the form dictionary is stored.

In step S1510, the completed form is reassembled by retrieving from memory vectorized data of the corresponding blank form in accordance with the stored indicia. The blank form is drawn line by line in accordance with the vectorized information. After the blank form is completely drawn, extracted data is superimposed with respective field header information into appropriate locations in the blank form. In step S1511, the reassembled completed form is corrected for skew and the result is displayed to the operator.

What is claimed is:

1. A method for creating a form dictionary, the method comprising the steps of:

scanning a first blank form;

creating a hierarchical profile of the first blank form;

scanning a plurality of exemplary completed forms of the first blank form;

creating a hierarchical profile for each exemplary completed form;

comparing each completed form hierarchical profile with each other completed form hierarchical profile to determine invariant elements between each completed form hierarchical profile;

extracting the invariant elements;

correlating the blank form hierarchical profile with the extracted invariant elements;

creating a first enhanced blank form hierarchical profile based on the correlating step; and storing the first enhanced blank form hierarchical profile in the form dictionary.

2. A method according to claim 1, further comprising the steps of:

scanning a second blank form;

creating a hierarchical profile of the second blank form;

scanning a plurality of exemplary completed forms of the second blank form;

creating a hierarchical profile of each exemplary completed form of the second blank form;

comparing the extracting invariant elements between the hierarchical profiles of each exemplary completed form of the second blank form;

correlating the second blank form hierarchical profile with the extracted invariant elements between the hierarchical profiles of each exemplary completed form of the second blank form to create a second enhanced blank form hierarchical profile; and storing the second enhanced blank form hierarchical profile in the form dictionary.

3. A method according to claim 2, further comprising the step of disambiguating, wherein the step of disambiguating comprises the steps of:

comparing the first enhanced blank form hierarchical profile and the second enhanced blank form hierarchical profile to determine invariant elements between the first enhanced blank form hierarchical profile and the second enhanced blank form hierarchical profile;

discarding the invariant elements from the first enhanced blank form hierarchical profile and the second blank form hierarchical profile to produce disambiguated hierarchical profiles of the first and second blank forms; and storing disambiguated hierarchical profiles of the first and second blank forms in the form dictionary.

4. A method for identifying a completed form using a form dictionary of hierarchical form profiles, each of said hierarchical form profiles consisting of vectorized data which defines features of a corresponding blank form, the method comprising the steps of:

creating hierarchical profiles of different blank forms;

comparing the hierarchical profiles of different blank forms to each other to determine invariant elements therebetween;

discarding the invariant elements;

storing remaining elements of each hierarchical profile in a form dictionary;

scanning a completed form;

creating a hierarchical profile of vectorized data corresponding to the completed form;

comparing the hierarchical profile of vectorized data corresponding to the completed form with the hierarchical form profiles in the form dictionary; and identifying, in accordance with the comparing step, one of the hierarchical form profiles in the form dictionary as corresponding to the hierarchical profile of the completed form.

5. A method according to claim 4, further comprising the step of extracting portions of the hierarchical profile of vectorized data corresponding to the completed form which differ from the identified hierarchical form profile in the form dictionary.

6. A method according to claim 5, further comprising the step of routing the extracted portions for processing in accordance with the identity of the corresponding hierarchical form profile.

7. A method according to claim 4, further comprising the step of storing predetermined data from the extracted portions in accordance with the identity of the corresponding hierarchical form profile.

8. A method according to claim 4, further comprising the step of displaying selected data from the extracted portions in accordance with the identity of the corresponding hierarchical form profile.

9. A method according to claim 4, further comprising the step of optical character recognition of selected data from the extracted portions in accordance with the identity of the corresponding hierarchical form profile.

10. A method for displaying completed portions of a form, the method comprising the steps of:

creating hierarchical profiles of different blank forms;

comparing the hierarchical profiles of different blank forms to each other to determine invariant elements therebetween;

discarding the invariant elements;

storing remaining elements of each hierarchical profile in a form dictionary;

scanning a completed form;

creating a hierarchical profile of vectorized data which defines features of the completed form;

comparing the hierarchical profile of vectorized data defining features of the completed form with a hierarchical profile of a blank form in the form dictionary;

extracting portions of the hierarchical profile defining features of the completed form which differ from corresponding portions of the hierarchical profile of the blank form; and displaying portions of the completed form which are dissimilar to corresponding portions of the blank form using the extracted portions of the hierarchical profile defining features of the completed form.

11. A method according to claim 10, wherein the step of extracting includes the step of extracting respective field header information for the extracted portions of the hierarchical profile of the completed form and displaying extracted portions with the respective header information.

12. A method according to claim 10, further comprising scanning a plurality of exemplary completed forms corresponding to a blank form;

creating a hierarchical profile of vectorized data corresponding to each exemplary completed form;

comparing each exemplary completed form hierarchical profile to each other exemplary completed form hierarchical profile to determine invariant elements between each of the exemplary completed form hierarchical profiles of vectorized data;

extracting the invariant elements from the completed form hierarchical profiles;

correlating a hierarchical profile of vectorized data of the blank form and the extracted invariant elements from the completed form hierarchical profiles of vectorized data to create an enhanced blank form hierarchical profile of vectorized data; and storing the enhanced blank form hierarchical profile of vectorized data in the form dictionary.

13. A method for routing completed forms, the method comprising the steps of:

scanning a plurality of different blank forms;

creating a hierarchical profile of vectorized data which defines features of a blank form for each scanned blank form;

comparing the hierarchical profiles to each other to determine invariant elements therebetween;

discarding the invariant elements;

storing remaining elements of each hierarchical profile in a form dictionary;

scanning a completed form;

creating a hierarchical profile of vectorized data corresponding to the completed form;

comparing the hierarchical profile of the completed form with the hierarchical profiles for the blank forms in the form dictionary;

identifying one of the hierarchical profiles for the blank forms in the form dictionary as corresponding to the hierarchical profile of the completed form in accordance with the result of a comparison; and routing the completed form for processing in accordance with the identity of the corresponding stored hierarchical profile.

14. A method according to claim 13, further comprising the steps of:

storing hierarchical profiles of vectorized data for a plurality of blank forms;

scanning a plurality of corresponding exemplary completed forms for each blank form;

creating a hierarchical profile of vectorized data for each exemplary completed form;

comparing each exemplary completed form hierarchical profile with each other corresponding exemplary completed form hierarchical profile to determine invariant elements between the exemplary completed form hierarchical profiles;

extracting the invariant elements from the corresponding exemplary completed form hierarchical profiles; and correlating each blank form hierarchical profile with extracted invariant elements of corresponding exemplary completed form hierarchical profiles to create enhanced blank form hierarchical profiles which are stored in the form dictionary.

15. A method for storing and retrieving completed portions of a form, the method comprising the steps of:

scanning a plurality of different blank forms;

creating a hierarchical profile of vectorized data which defines features of a blank form for each scanned blank form;

comparing the hierarchical profiles to each other to determine invariant elements therebetween;

discarding the invariant elements;

storing remaining elements for each hierarchical profile in a form dictionary;

scanning a completed form;

creating a hierarchical profile of vectorized data for the completed form;

comparing the hierarchical profile of the completed form with the hierarchical profiles for the blank forms in the form dictionary;

identifying one of the hierarchical profiles of the blank forms as corresponding to the hierarchical profile of the completed form in accordance with a result of the comparison;

extracting completed portions of the completed form and respective header information which differ from the blank form corresponding to the identified stored hierarchical profile; and displaying the extracted completed portions and respective header information.

16. A method according to claim 15, further comprising the steps of:

storing hierarchical profiles of vectorized data for a plurality of blank forms;

scanning a plurality of corresponding exemplary completed forms for each blank form;

creating a hierarchical profile of vectorized data for each exemplary completed form;

comparing each exemplary completed from hierarchical profile with each other corresponding exemplary completed from hierarchical profile to determine invariant elements between the exemplary completed form hierarchical profiles;

extracting the invariant elements from the corresponding exemplary completed form hierarchical profiles; and correlating the blank form hierarchical profiles with extracted invariant elements of corresponding exemplary completed form hierarchical profiles to create enhanced blank form hierarchical profiles of vectorized data which are stored in the form dictionary.

17. An apparatus for identifying a completed form using a form dictionary of hierarchical form profiles, each of said hierarchical profiles consisting of vectorized data which defines features of a corresponding blank form, the apparatus comprising:

comparing means for comparing hierarchical profiles of different blank forms to each other to determine invariant elements therebetween;

discarding the invariant elements;

storing remaining elements of each hierarchical profile in a form dictionary;

scanning means for scanning a completed form;

profile creating means for creating a hierarchical profile of vectorized data corresponding to the completed form;

comparison means for comparing the hierarchical profile of vectorized data corresponding to the completed form with the hierarchical form profiles in the form dictionary;

identifying means for identifying, in accordance with the result of the comparing means, one of the hierarchical form profiles in the form dictionary as corresponding to the hierarchical profile of the completed form; and extracting means for extracting portions of the hierarchical profile of the completed form which differ from the identified hierarchical form profile in the form dictionary.

18. An apparatus according to claim 17, further comprising routing means for routing the extracted portions for processing in accordance with the identity of the identified hierarchical form profile of vectorized data.

19. An apparatus according to claim 17, further comprising storing means for storing predetermined data from the extracted portions in accordance with the identity of the identified hierarchical form profile of vectorized data.

20. An apparatus according to claim 17, further comprising displaying means for displaying selected data from the extracted portions in accordance with the identity of the identified hierarchical form profile of vectorized data.

21. An apparatus according to claim 17, further comprising character recognition means for recognizing selected data from the extracted portions in accordance with the identity of the identified hierarchical form profile of vectorized data.

22. An apparatus for displaying completed portions of a form, the apparatus comprising:

comparing means for comparing hierarchical profiles of different blank forms to each other to determine invariant elements therebetween;

discarding the invariant elements;

storing remaining elements of each hierarchical profile in a form dictionary;

scanning means for scanning a completed form;

profile creating means for creating a hierarchical profile of vectorized data which defines features of the completed form;

comparison means for comparing the hierarchical profile of vectorized data defining features of the completed form with a hierarchical profile of vectorized data corresponding to a blank form stored in the form directory;

extracting means for extracting portions of the hierarchical profile defining features of the completed form which differ from the hierarchical profile corresponding to the blank form; and displaying means for displaying portions of the completed form which are dissimilar to corresponding portions of the blank form using the extracted portions of the hierarchical profile defining features of the completed form.

23. An apparatus according to claim 22, further comprising identifying means for identifying the scanned completed form by comparing the completed form to blank forms stored in the form dictionary.

24. An apparatus according to claim 22, wherein the extracting means includes means for extracting respective field header information with the extracted portions of the hierarchical profile corresponding to the completed form and the displaying means displays the extracted portions with the respective header information.

25. An apparatus according to claim 22, further comprising the steps of:
- scanning means for scanning a plurality of exemplary completed forms corresponding to a blank form;
- form profile creating means for creating a hierarchical profile of vectorized data corresponding to a blank form and for creating a hierarchical profile of vectorized data corresponding to each exemplary completed form;
- comparing means for comparing each exemplary completed from hierarchical profile to each other exemplary completed from hierarchical profile to determine invariant elements between each exemplary completed form hierarchical profile of vectorized data;
- extracting the invariant elements from the completed from hierarchical profiles; and
- correlating means for correlating the hierarchical profile of the blank form and the extracted invariant elements from the exemplary completed form hierarchical profiles to create an enhanced blank form hierarchical profile of vectorized data which is stored in the form dictionary.

26. An apparatus for identifying completed forms, the apparatus comprising:
- comparing means for comparing hierarchical profiles of different blank forms to each other to determine invariant elements therebetween;
- discarding means for discarding the invariant elements;
- storing means for storing remaining elements of each hierarchical profile in a form dictionary;
- memory means for storing the form dictionary;
- scanning means for scanning a completed form;
- creating means for creating a hierarchical profile of vectorized data for the completed form;
- comparison means for comparing the hierarchical profile of vectorized data for the completed form with the stored hierarchical profiles of vectorized data in the form dictionary;
- identifying means for identifying one of the stored hierarchical profiles of vectorized data as corresponding to the completed form hierarchical profile of vectorized data in accordance with the result of the comparison by the comparing means; and
- routing means for routing the completed form for processing in accordance with corresponding stored hierarchical profile of vectorized data.

27. A completed form identifier, comprising:
- comparing means for comparing hierarchical profiles of different blank forms to each other to determine invariant elements therebetween;
- discarding means for discarding the invariant elements;
- storing means for storing remaining elements of each hierarchical profile in a form dictionary;
- a scanner for scanning a completed form;
- a hierarchical profile creator for creating a hierarchical profile of vectorized data which defines features of the scanned completed form;
- a comparator for comparing the hierarchical profile of the scanned completed form with hierarchical profiles of vectorized data corresponding to various blank forms stored in the form dictionary;
- a form identifier for identifying the completed form based on a comparison result of the comparator; and
- a form router for routing the completed form for further processing based on an identification result of the form identifier.

28. An apparatus for displaying extracted data from a completed form, comprising:
- comparing means for comparing hierarchical profiles of different blank forms to each other to determine invariant elements therebetween;
- discarding means for discarding the invariant elements;
- storing means for storing remaining elements of each hierarchical profile in a form dictionary;
- a scanner for scanning a completed form;
- a hierarchical profile creator for creating a hierarchical profile of vectorized data which defines features of the scanned completed form;
- a comparator for comparing the hierarchical profile of vectorized data corresponding to the completed form to hierarchical profiles of vectorized data corresponding to various blank forms stored in the form dictionary;
- a form identifier for identifying the completed form and for extracting data from the completed form based on an identification result of the identifier; and
- a display screen for displaying the extracted data.

29. An apparatus for displaying a completed form, comprising:
- comparing means for comparing hierarchical profiles of different blank forms to each other to determine invariant elements therebetween;
- discarding means for discarding the invariant elements;
- storing means for storing remaining elements of each hierarchical profile in a form dictionary;
- a scanner for scanning a completed form;
- a hierarchical profile creator for creating a hierarchical profile of vectorized data which defines features of the scanned completed form;
- a comparator for comparing the hierarchical profile of the scanned completed form to hierarchical profiles of blank forms in the form dictionary and for locating a blank form hierarchical profile which matches the completed form hierarchical profile;
- a data extractor for extracting data identifiers and data which is dissimilar to the matching blank form hierarchical profile from the hierarchical profile of the completed form;
- a memory for storing the extracted data, data identifiers, and an indicia of the matching blank form; and
- a screen display for displaying the extracted data superimposed on the matching blank form, wherein the matching blank form is drawn in accordance with the hierarchical profile of the blank form, and wherein the extracted data is superimposed into appropriate locations of the matching blank form in accordance with the extracted data identifiers.

30. A form identifier for identifying a completed form using a form dictionary of hierarchical form profiles, each of said hierarchical form profiles consisting of vectorized data which defines features of a corresponding blank form, the form identifier comprising:

comparing means for comparing hierarchical profiles of different blank forms to each other to determine invariant elements therebetween;

discarding means for discarding the invariant elements;

storing means for storing remaining elements of each hierarchical profile in a form dictionary;

a processing unit including a computer for executing stored program steps;

a memory for storing the form dictionary of hierarchical form profiles and process steps for execution by the processing unit; and a scanner for scanning completed forms, wherein the process steps stored in the memory include steps to create a hierarchical profile of vectorized data corresponding to a scanned completed form, to compare the hierarchical profile of the completed form to the hierarchical form profiles in the memory, to match the hierarchical form profile of the completed form to one of the hierarchical form profiles in the memory, and to form-process the completed form based on an identity of the matched hierarchical form profile in the memory.

31. A form identifier according to claim 30, wherein the process step of form-processing includes routing the completed form to an appropriate key-input operator.

32. A form identifier according to claim 30, wherein the process step of form-processing includes extracting invariant elements from the completed form hierarchical profile based on a comparison to the matched hierarchical form profile and displaying the extracted invariant elements to a key-input operator.

* * * * *

UNITED STATES PATENT AND TRADEMARK OFFICE
CERTIFICATE OF CORRECTION

PATENT NO. : 5,721,940
DATED : February 24, 1998
INVENTOR(S) : Luther et al.

It is certified that error appears in the above-indentified patent and that said Letters Patent is hereby corrected as shown below:

On the title page: Item [56]

<u>References Cited</u>

U.S. PATENT DOCUMENTS

"5,050,101    9/1991" should read --5,050,101    8/1991--.

<u>COLUMN 13</u>

Line 50, "from" should read --form--.
Line 52, "from" should read --form--.

<u>COLUMN 14</u>

Line 57, "directory" should read --dictionary--.

<u>COLUMN 15</u>

Line 12, delete "the steps of".
Line 20, "from" should read --form--.
Line 21, "from" should read --form--.
Line 24, "from" (2nd occurrence) should read --form--.

Signed and Sealed this

Eighteenth Day of August, 1998

Attest:

BRUCE LEHMAN

*Attesting Officer*                *Commissioner of Patents and Trademarks*